United States Patent [19]

Bingham

[11] 3,871,019

[45] Mar. 11, 1975

[54] LINE SEQUENTIAL COLOR TELEVISION RECORDING SYSTEM

[75] Inventor: Joseph Peter Bingham, Birchwood Ct., N.J.

[73] Assignee: RCA Corporation, New York, N.Y.

[22] Filed: Apr. 13, 1973

[21] Appl. No.: 350,899

[30] Foreign Application Priority Data

Apr. 19, 1972 Great Britain .................... 18155/72

[52] U.S. Cl. ........................................ 358/4, 358/12

[51] Int. Cl. ............................................. H04n 9/02

[58] Field of Search ........... 178/5.2 R, 5.4 R, 5.4 C, 178/5.4 CD; 358/4, 12

[56] References Cited

UNITED STATES PATENTS 3,598,904 8/1971 Foerster .......................... 178/5.4 C 3,730,983 5/1973 Numakura et al. ........... 178/5.4 CD

FOREIGN PATENTS OR APPLICATIONS 859,081 1/1961 Great Britain .................. 178/5.2 R

*Primary Examiner*—Richard Murray

*Attorney, Agent, or Firm*—Eugene M. Whitacre; William H. Meagher

[57] ABSTRACT

A line sequential color signal coding format for a limited bandwidth video recording system is disclosed which achieves improved vertical transient response during playback display. Spectrum interleaving is employed between the luminance signal and color difference chrominance signals during encoding, with the necessary signal separation during decoding being effected by comb filtering using delay lines. Prefiltering may be implemented during encoding to comb out crosstalk producing signals from the luminance and chrominance signal spectrums.

To avoid contamination of the mixed high frequency luminance components in the decoder by the switched low frequency components, the composite signal may be fed through a high pass luminance filter in the decoder whose cutoff frequency is above that of a low pass filter in the encoder through which the switched, line sequential components are fed.

27 Claims, 8 Drawing Figures

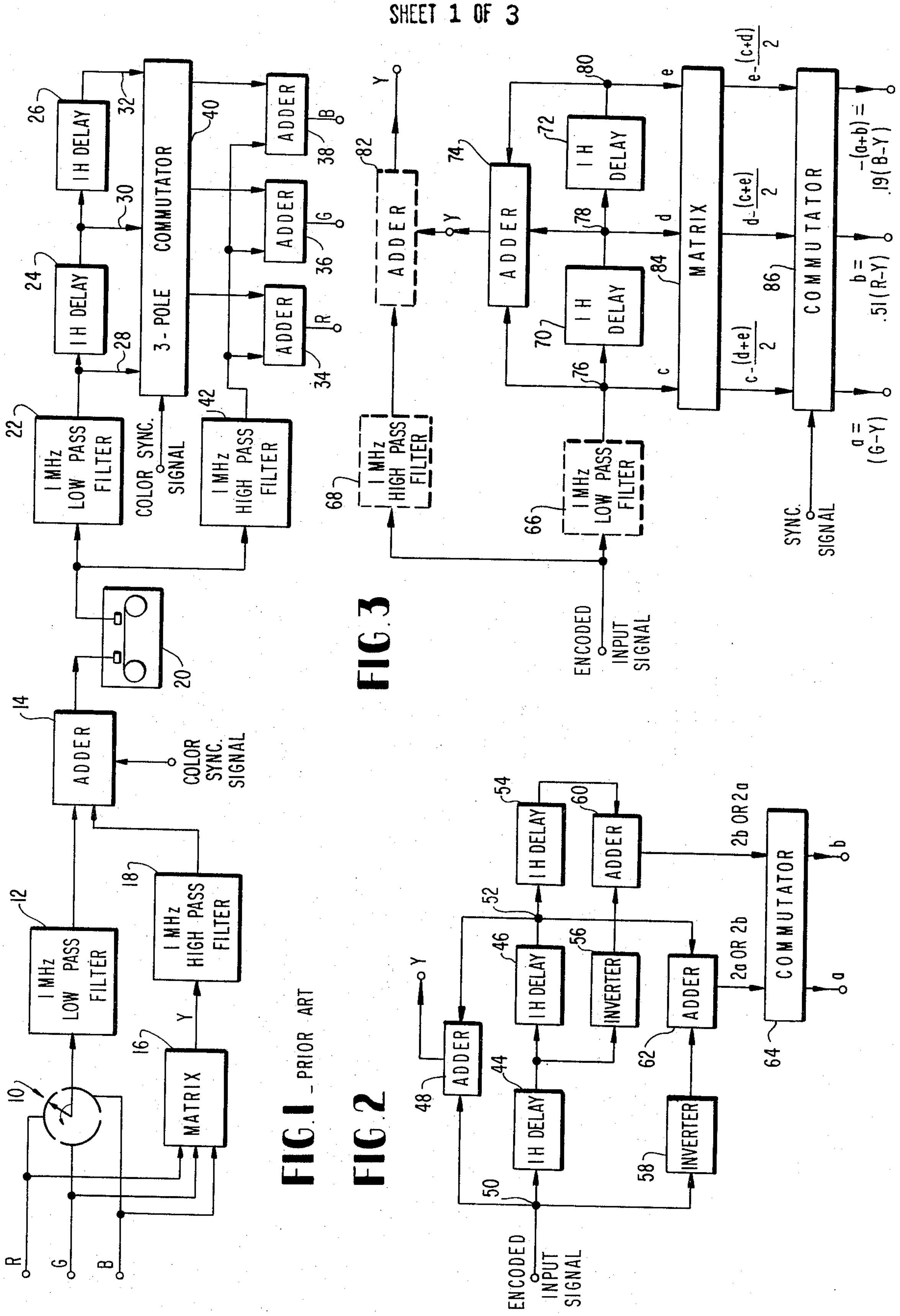
FIG. 1 _PRIOR ART, FIG. 2, FIG. 3

LINE SEQUENTIAL COLOR TELEVISION RECORDING SYSTEM

BACKGROUND OF THE INVENTION

1. Field of The Invention

The invention relates in general to color television recording systems, and more particularly to a novel line sequential color signal coding format for a narrowband video recording system which exhibits improved vertical transient response during playback.

2. Description Of The Prior Art

The majority of the existing systems for recording color television signals rely on the use of a separate carrier to convey the color or chrominance information, in a manner similar to standard broadcast practice common to the NTSC, PAL and SECAM systems that have been adopted by various countries throughout the world. The use of a separate color carrier requires a relatively wide frequency ban allocation, however, and thus for limited bandwidth video color recording systems other methods must be sought to convey both the chrominance and the luminance information in the available channel.

One approach that has been used in narrowband video color recording systems in the prior art utilizes the concept of line sequential color encoding. See for example the article by W. Bruch entitled Neue Methoden der Farbbildaufzeichnung auf einfachen Magnetbandgeraten (TRIPAL) in Telefunken Zeitung 1967, Book 3 Pages 234–242, and U.S. Pat. No. 3,440,340 entitled Colour Television Signal Recording and Reproducing System issued to Y. Sugihara on Apr. 22, 1969. In these systems successive lines of red, blue and green color signals are recorded sequentially, and are recombined at the receiver with delay lines to form a simultaneous three color image. Stated another way, only the red color signal is recorded for a given horizontal scan line, only the blue signal is recorded for the next line, only the green signal is recorded for the next line, and so on in a repetitive, sequential manner. During playback only one of the three primary color signals, say the red signal, is a fresh or new signal for a given horizontal scan line. The green signal for the given line is the same green signal that was used for the previous line, and the blue signal is the same blue signal that was used two lines ago.

A block diagram of such a line sequential system, similar to that described in the article of Bruch, is shown in FIG. 1 of the drawings. In the encoding portion of the system the simultaneous red, green and blue signals available at the input terminals are switched on a line-by-line basis by an electronic sequencing switch 10, shown in a mechanical schematic form for the sake of simplicity, to form a line sequential signal. This signal is fed through a 1 MHz los pass filter 12 and mixed in adder 14 with the high frequency luminance components of the signal extracted from the primary color inputs by an encoding matrix 16 and fed through a 1 MHz high pass filter 18. The combined signal at the output of adder 14, including the necessary color synchronizing signal, is supplied to a suitable recorder 20.

In the decoding section of the system the combined signal from recorder 20 is fed through a 1 MHz low pass filter 22 to select the switched line sequential components, which are then applied to two 1H delay elements 24, 26 connected in series. The 1H designation signifies that each element provides a delay equal to the time required for one horizontal line scan. The functioning of the delay elements thus make all of the low frequency color components available simultaneously on lines 28, 30 and 32, and the respective red, green and blue signals are thereafter directed to the appropriate output channel adders 34, 36 and 38 by a three-pole commutator 40 synchronized with the sequencing switch 10 in the encoder section.

The combined signal from the recorder is also fed through a 1 MHz high pass filter 42 to separate the high frequency liminance components of the signal, which are then added equally to the low frequency red, green and blue signals. Thus, simultaneous red, green and blue color signals with mixed high frequency luminance components are available at the output terminals and may be directed to a suitable monitor for viewing.

As might be expected with such a system, a severe loss in vertical resolution is suffered, and peculiar transient effects occur when sharp horizontal and diagonal edges are encountered in a picture being scanned. As an example, consider a black-to-white horizontal edge occuring between lines 8 and 9 in a scanning frame, each frame being made up of two interlacing fields. If the line sampling sequence is RGBRG, etc., then in the 525 line NTSC system the sampling sequence in a full interlaced frame would be RBGRB, etc. The color sample values occuring on successive lines over the transition or edge are shown in column four of Table 1 below.

TABLE I

COLOR SAMPLES AND LUMINANCE VALUES ON A HORIZONTAL EDGE

| FRAME LINE | SAMPLE COLOR | FIELD | SAMPLE VALUE | | LUMINANCE VALUE |
|---|---|---|---|---|---|
| 5 | B | 1 | 0 | B L | 0 |
| 6 | G | 2 | 0 | A C | 0 |
| 7 | R | 1 | 0 | K | 0 |
| 8 | B | 2 | 0 | ↓ | 0 |
| 9 | G | 1 | 1 | ↑ | .59 |
| 10 | R | 2 | 1 | W H | .30 |
| 11 | B | 1 | 1 | I T | .70 |
| 12 | G | 2 | 1 | E | .89 |
| 13 | R | 1 | 1 | | 1.00 |
| 14 | B | 2 | 1 | | 1.00 |
| 15 | G | 1 | 1 | | 1.00 |

If these color sample values are recombined using the prior art recording system shown in FIG. 1, the luminance or brightness values on the corresponding lines of the playback monitor will be as shown in column five of Table 1.

As is clearly illustrated, an irregular luminance transient exists between lines 8 and 13 which appears first to increase, then decrease, and finally to increase again until the steady white values are reached at line 13. The presence of such transients causes the appearance of objectionable striations and shark's teeth on horizontal and diagonal edges, and thus renders the simple RGB line sequential system of the prior art unacceptable for practical home viewer applications. These transients can be reduced by vertical filtering prior to recording, but this tends to further reduce vertical resolution to an unacceptable degree.

SUMMARY OF THE INVENTION

This invention provides a narrowband line sequential color television recording system which does not suffer from the shortcomings of the straightforward red-green-blue system described above, and which is characterized by improved vertical transient response during playback monitoring. The central concept employed is that of spectrum interleaving of chrominance and luminance signals, with comb filtering techniques being used to separate the interleaved chrominance and luminance signals during decoding. Advantage is made of the fact that the frequency distribution spectrum of the luminance signal comprises components that lie primarily at multiples of $f_H$, the horizontal line scanning frequency, and that the frequency distribution spectrum of a suitably encoded line sequential chrominance signal primarily comprises components that can be made to conveniently interleave with the liminance spectrum.

Signal coding formats are developed which basically comprise a luminance signal and a color difference chrominance signal for each horizontal line. Encoding is implemented by developing the standard formula luminance signal and the color difference chrominance signals in a suitable encoding matrix supplied with the primary RGB color inputs. The color difference signals are repetitively coupled through an electronic sequencing switch synchronized with the horizontal line scanning frequency to a low pass filter whose output is applied to an adder along with the luminance signal. The spectrum interleaved output from the adder, which also contains the necessary color synchronizing signal, is then supplied to a suitable video recorder.

To the extent that crosstalk between the interleaved luminance and chrominance signals may be a problem due to the presence of overlapping signal components that cannot be separated by comb filtering at the decoder, this may be eliminated by properly comb filtering both liminance and chrominance signals prior to combining in the encoder output adder to preclude the presence of such overlapping components.

The decoding function is implemented by comb filtering using series connected 1H delay elements and an appropriate decoding matrix. The matrix may be resistive, electronic, or a combination of both, with the particular decoder configuration depending primarily upon the coding format employed.

In one embodiment using a coding format comprising a luminance signal and a three line repeating sequence of color difference signals, the encoded signal from the recorder is low passed through a 1 MHz filter to the input of two 1H delay elements connected in series. The low frequency luminance components are combed from the interleaved luminance and chrominance spectrums by an adder supplied with the signals at the input, intermediate and output nodes of the delay elements. These low frequency luminance components are then added to the high frequency luminance components obtained from the output of a 1 MHz high pass filter fed by the encoded recorder signal to reconstruct and obtain the full range luminance signal. The three color difference components are combed from the interleaved spectrums by coupling the signals at the three delay element nodes to a decoding matrix, whose outputs are then fed to a commutator synchronized with the encoder sequencer which directs the respective color difference signals to their proper output channels.

Any contamination of the high frequency luminance components by the switched low frequency components may be reduced by setting the cutoff frequency of the high pass filter in the decoder above that of the low pass filter in the encoder through which the switched components are derived.

BRIEF DESCRIPTION OF THE DRAWINGS

In the drawings:

FIG. 1 shows, as previously stated, a block diagram of a straight RGB line sequential color television recording system as taught in the prior art, FIG. 2 shows a block diagram of a line sequential decoder according to the invention suitable for use with a first encoding format developed below, FIG. 3 shows a block diagram of a line sequential decoder according to the invention suitable for use with a second encoding format developed below.

DESCRIPTION OF THE PREFERRED EMBODIMENTS

Figure 4:
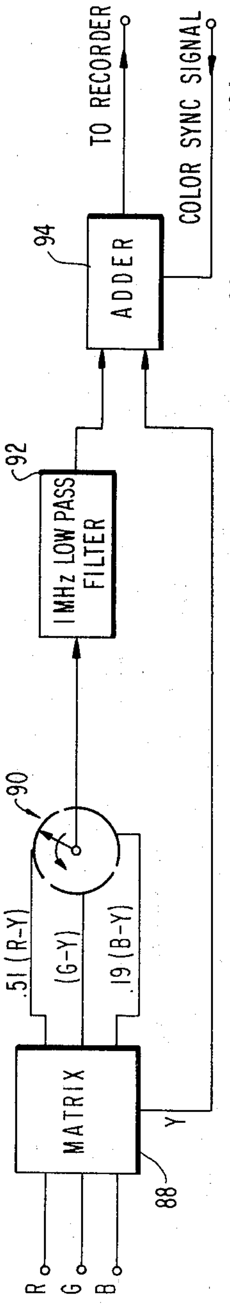
FIG. 4 shows a block diagram of a line sequential encoder suitable for use with said second encoding format.

To illustrate the principles of the invention reference is made to the coding format, presented by way of example only, set forth in Table II below.

TABLE II

LINE SEQUENTIAL CHROMINANCE CODING FORMAT

| HORIZONTAL FRAME LINE | SIGNAL |
|---|---|
| 1 | Y + *a* |
| 2 | Y + *b* |
| 3 | Y − *a* |
| 4 | Y − *b* |
| 5 | Y + *a* |

The luminance signal Y is derived from the standard formula according to which Y = 0.59G+0.30R+0.11B, and *a*, *b* are chrominance signals.

As is well known, the frequency spectrum of the Y signal is centered primarily about multiples of the horizontal line scanning frequency, $f_H$. The frequency spectrum of the chrominance components can be determined mathematically by considering the pair of *a* samples of lines 1 and 3. If the Fourier transform of the *a* sample of line 1 is a (ω), then the Fourier transform of the pair of samples $a'(\omega)$ is given by:

$$a'(\omega) = a(\omega)\ [1 - e^{-2j\,\omega\,H}], \quad (1)$$

where H is the horizontal line period, to the extent that the two samples are correlated.

The frequency spectrum defined by equation (1) is seen to have a maximum when:

$$2\omega H = (2n+1)\pi, \text{ or } \omega=(2n+1)\pi/2H, \quad (2)$$

that is, at odd multiples of one-fourth the line frequency. Similarly, the spectrum is seen to be zero when:

$$2\omega H = 2n\pi, \text{ or } \omega=n\pi/H, \quad (3)$$

that is, at multiples of the line frequency.

Since the *a* samples are repeated in a four line cycle, the *a* spectrum will thus lie primarily at odd multiples of one-fourth the line frequency. A similar analysis shows that the *b* chrominance signal spectrum is located about the same frequencies, but that it is in phase quadrature with respect to the *a* chrominance signal spectrum. The foregoing clearly illustrates that the energy concentrations of the luminance and chrominance signals in the coding format of Table II lie at different frequencies, and thus their spectrums may be conveniently interleaved with each other during encoding.

A suitable decoder for a line sequential signal encoder according to the format of Table II is shown in block diagram form in FIG. 2. In this arrangement the luminance signal Y is separated from the composite, encoded input signal by the comb filter made up of the 1H delay elements 44 and 46 and the adder 48. The operation of such a comb filter is well known in the art, and may be readily understood by considering that at any given time the luminance signals Y present at nodes 50 and 52 will be additive, while the chrominance signals at these nodes, being of opposite polarity in Table II since they are two lines apart, will be subtractive. Thus, the chrominance signals will substantially cancel each other leaving only the luminance signal at the output of adder 48.

The chrominance signals are separated from the composite signal in a similar manner by a comb filter including 1H delay elements 44, 46 and 54, inverters 56 and 58, and adders 60 and 62, connected as shown. The operation of this chrominance comb filter is similar to that described above, with the exception that the inverters now render the luminance signals Y subtractive and the respective chrominance signal pairs *a*, -*a* and *b*, -*b* additive. The commutator 64, whose synchronizing signal input is not shown for simplicity, performs the final function of directing the chrominance signals *a* and *b* to their proper output channels. Thus, the luminance and chrominance signals are made simultaneously available, and may be coupled to a suitable monitor for playback display. It would be possible to construct a decoder somewhat simpler than that of FIG. 2 for the coding format of Table II, using only two 1H delay elements. However, the arrangement of FIG. 2 clearly demonstrates the principles of spectrum interleaving employed in the invention.

A second signal coding format within the scope of the invention is developed in Table III below.

TABLE III

LINE SEQUENTIAL CHROMINANCE CODING FORMAT

| HORIZONTAL FRAME LINE | SIGNAL |
|---|---|
| 1 | Y + *a* |
| 2 | Y − (*a*+*B*) |
| 3 | Y + *b* |
| 4 | Y + *a* |
| 5 | Y − (*a*+*B*) |

Once agian, Y is the standard formula luminance signal whose spectrum lies about multiples of $f_H$, and *a* and *b* are chrominance signals.

For this coding format the Fourier transform $a'(\omega)$ for the spectrum of the pair of *a* samples of lines 1 and 2 in Table III is given by:

$$a'(\omega) = a(\omega)\ [1-e^{-j\ \omega\ H}], \quad (4)$$

where $a(\omega)$ is the Fourier transform of the *a* sample and H is again the horizontal line period. Once again, the spectrum of $a'(\omega)$ as defined in equation (4) is seen to have nulls, or zero energy concentrations, at multiples of $f_H$. Conversely, since the complete sampling cycle format of Table III spans three horizontal line scanning periods, the spectrum of the *a* signal will have maximum energy concentrations or information content at frequencies that are multiples of one-third the horizontal line frequency, or $f_H/3$. A similar analysis reveals, as before, that the spectrum of the *b* chrominance signal is also maximized at multiples of $f_H/3$ and nulled at multiples of $f_H$, but that it is shifted in phase with respect to the *a* signal.

A suitable decoding arrangement for a line sequential signal encoded according to the format of Table III is shown in block diagram form in FIG. 3. The encoded, composite input signal from the recorder is supplied to a 1 MHz low pass filter 66 and a 1 MHz high pass filter 68. The output from the low pass filter is fed to a comb filter comprising series connected 1H delay elements 70 and 72, and an adder 74 whose inputs are taken from nodes 76, 78 and 80. Since the transfer function of this comb filter has nulls at multiples of $f_H/3$ and maximums at multiples of $f_H$, it combs out the low frequency components of the luminance signal which are then coupled with the high frequency luminance components in adder 82 to recover the full range luminance signal Y.

The filters 66 and 68 and the adder 82 are shown in broken line form since these components are optional and may be omitted in some applications, similar to the arrangement shown in FIG. 2.

The chrominance signals are separated from the composite, interleaved input signal by the comb filter comprising delay elements 70 and 72 and a decoding matrix 84. The matrix inputs are designated c, d and e in order to conveniently indicate the mathematical functions performed by the matrix. The input signal c may be any one of the composite line signals from Table III. signal d is then the composite signal from the previous line, and signal e is the composite signal from two previous lines. Each matrix output is defined as one of the matrix inputs minus one half of the sum of the other two inputs. A simple mathematical analysis will show that with these signal relationships all of the luminance components Y as well as two of the chrominance signals $a$, $b$, and $-(a+b)$ will cancel out, thus providing a single chrominance signal at each matrix output. The commutator 86, synchronized with the line sequencing switch in the encoder, then directs the separate chrominance signals to their appropriate output channels.

Bearing in mind that a series connection of 1H delay elements is the means typically employed in decoding a line sequential signal, as seen in FIG. 1, it may now be appreciated that in the instant invention these same delay elements perform the additional function of comb filtering. They thus operate in a dual capacity, which results in a distinct hardware savings and overall cost economy.

In both of the line sequential coding formats developed above in Table II and III, the choice of the chrominance signals $a$ and $b$ must be based on considerations of dynamic range, decoder simplicity, and optimum spectral placement of the signal components. For the coding format of Table III these criteria are well served by assigning the chrominance signals the following values:

$$a = k_1 (\text{G-Y}) \quad (5)$$
$$b = k_2 (\text{R-Y}) \quad (6)$$
$$-(a+b) = k_3 (\text{B-Y}) \quad (7)$$

The numeric values of the constants $K_1$, $K_2$ and $k_3$ may be determined from the following equation:

$$k_1 (\text{G}-\text{Y}) + k_2 (\text{R}-\text{Y}) + k_3 (-\text{Y}) = a+b-(a+b) = \text{O}, \quad (8)$$

with the additional knowledge, well established in the prior art, that:

$$(\text{G}-\text{Y}) + 0.51 (\text{R}-\text{Y}) + 0.19 (\text{B}-\text{Y}) = \text{O}. \quad (9)$$

If the chrominance signal on any given line in the coding format of Table III is to be restricted to a miximum value of units, then it follows that: $k_1 = \mathbf{1}$, $k_2 = 0.51$, and $k_3 = 0.19$.

The completed coding format of Table III then appears as presented below in Table IV.

TABLE IV

LINE SEQUENTIAL CHROMINANCE CODING FORMAT

| HORIZONTAL FRAME LINE | SIGNAL |
|---|---|
| 1 | Y + (G-Y) |
| 2 | Y + .19 (B-Y) |
| 3 | Y + .51 (R-Y) |
| 4 | Y + (G-Y) |
| 5 | Y + .19 (B-Y) |

A line sequential color video recording system was built using the coding format of Table IV. It was found to operate satisfactorily and as predicted, and exhibited improved vertical transient response as compared with the prior art systems, particularly in the case of sharp horizontal and diagonal transitions. The synchronizing signal used was a line identification burst of 2.0MHz of 2 microseconds duration recorded on the back porch of each [Y + 0.51 (R—Y)] signal. This burst is separated during playback by any suitable means well known in the art and used to synchronize the decoder commutator with the line sequencing switch in the encoder.

Using the coding format of Table IV the luminance transient across a sharp horizontal black - white edge between lines 8 and 9 appears as shown below in Table V:

TABLE V

LUMINANCE TRANSIENT ACROSS A HORIZONTAL EDGE

| FRAME LINE | SIGNAL | FIELD | SIGNAL VALUE | | LUMINANCE VALUE |
|---|---|---|---|---|---|
| 5 | Y + $a$ | 1 | 0 | B L | 0 |
| 6 | Y −($a$+$b$) | 2 | 0 | A C | 0 |
| 7 | Y + $b$ | 1 | 0 | K | 0 |
| 8 | Y + $a$ | 2 | 0 | ↓ | 0 |
| 9 | Y −($a$+$b$) | 1 | 1 | ↑ W | .33 |
| 10 | Y + $b$ | 2 | 1 | H I | .33 |
| 11 | Y + $a$ | 1 | 1 | T E | .67 |
| 12 | Y −($a$+$b$) | 2 | 1 | | .67 |
| 13 | Y + $b$ | 1 | 1 | | 1.00 |
| 14 | Y + $a$ | 2 | 1 | | 1.00 |
| 15 | Y −($a$+$b$) | 1 | 1 | | 1.00 |

A comparison of the luminance values shown in Table V with those shown in Table I serves to clearly illustrate the improved vertical transient response characteristics achieved by the invention with respect to those achieved by the prior art.

Given the coding format of Table IV, whose signal values are also indicated at the outputs of the decoder commutator 86 in FIG. 3, a suitable encoder is shown in simplified block diagram form in FIG. 4. The RGB primary color inputs are applied to an encoding matrix 88 which develops therefrom a full spectrum luminance output Y and the three color difference chrominance signals (G - Y), 0.51(R - Y) and 0.19(B - Y). The latter are sequentially coupled through a line sequencing switch 90 to a 1 MHz low pass filter 92. The luminance and chrominance signals are combined or interleaved in adder 94, along with a color synchronizing signal, and the composite output signal is then available for recordation.

With the chrominance signals of equations 5–7, (B-Y) is weighted during encoding with an amplitude factor of 0.19 and (R-Y) is similarly weighted with an amplitude factor 0.51. To equalize the weightings of the signals upon decoding, (B-Y) must therefore be amplified by a factor of 5.3 and (R-Y) must be amplified by a factor of 2.0. This necessarily results in the (B-Y) and (R-Y) signals suffering a greater loss in signal-to-noise ratio when passing through their respective video channels than does the unweighted (G-Y) signal.

To the extent that this effect may become noticably objectionable during playback, other choices for the color difference signals $a$, $b$, and $-(a+b)$ are possible which will improve the comparative (B-Y) and (R-Y) channel noise performances. One such choice is based on the standard NTSC chrominance subcarrier. Color difference signals that are transmitted 120° apart on the subcarrier necessarily sum to zero. Thus, the 0°, 120°, and 240° NTSC signal vectors can be assigned to the chrominance signals a, b, and $-(a+b)$ as follows: 8n

$$a = .493\ (B-Y) \quad (10)$$
$$B = .877\ (R-Y)\cos 30^\circ - .493(B-Y)\cos 60^\circ \quad (11)$$
$$-(a+b) = -.877\ (R-Y)\cos 30^\circ - .493(B-Y)\cos 60^\circ \quad (12)$$

These chrominance signals can be interleaved with the luminance signals using the encoder of FIG. 6 described below, and can be separated therefrom using the decoder of FIG. 5 described below. The commutator outputs will now, however, be equal to the signals given in equations 10–12 rather than those given in equations 5–7. In this instance 0.493 (B-Y) is present as signal $a$, 1.754 (R-Y) can be obtained by subtracting $-(a+b)$ and $b$, and 1.4 (G-Y) is very nearly equal to $-(a+b)$.

Overall system performance may be further enhanced by equalizing the signals prior to recording to compensate for the effects of comb filtering on playback, and by prefiltering the signals to eliminate cross-talk between the chrominance and luminance spectrums. The latter approach will be more fully developed below.

Figure 5:
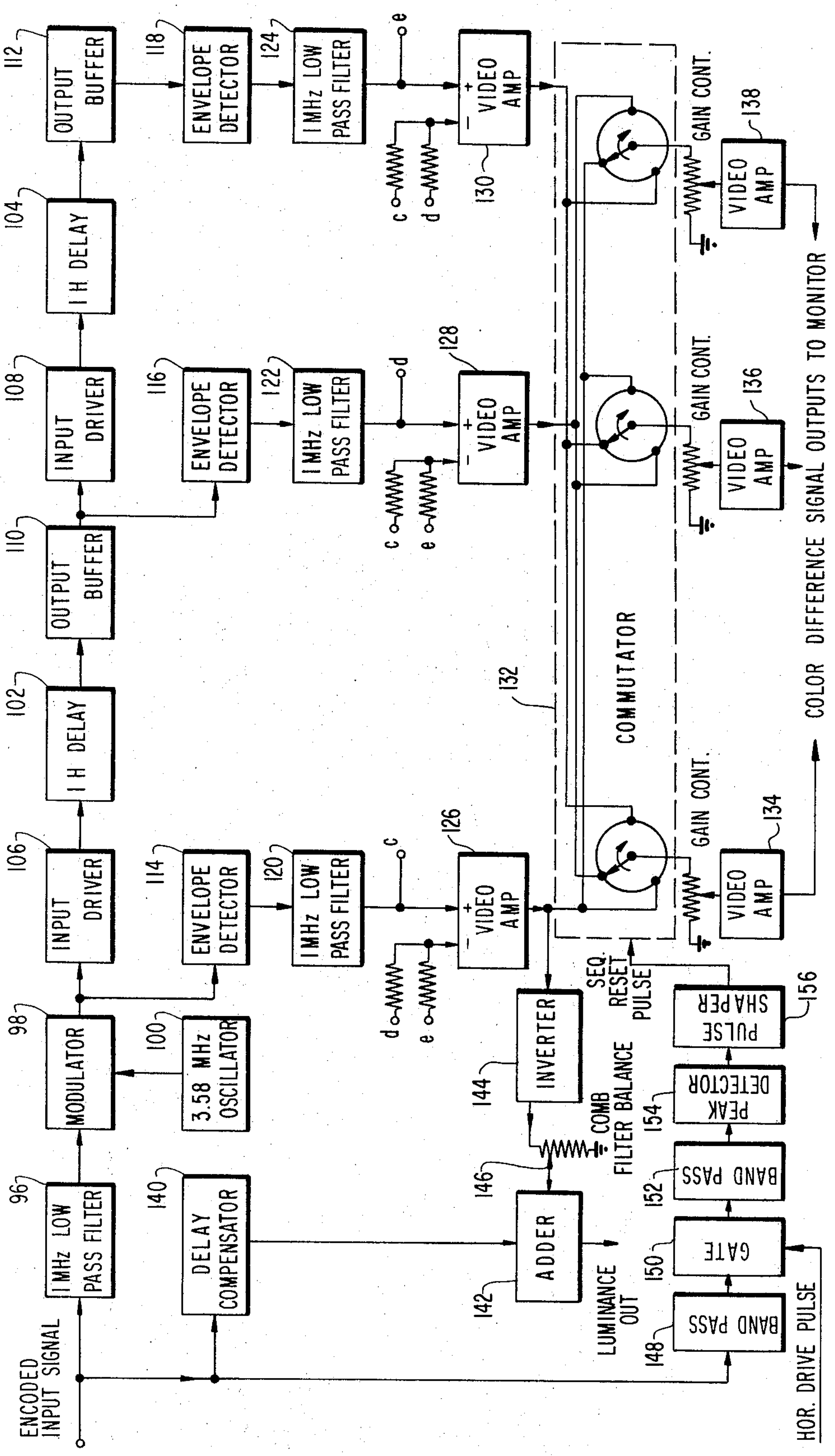
FIG. 5 shows a more detailed block diagram of a line sequential decoder similar to that of FIG. 3.

Reference is now made to FIG. 5, which shows a more detailed block diagram of a line sequential decoder for use with the coding format of Table IV. The composite, encoded input signal is the line sequential color difference signal recovered from the record or derived directly from a suitable encoding system. Following this signal through the upper or horizontal path, it is first band-limited to approximately 1 MHz in low pass filter 96 and is then modulated at 98 onto a 3.58 MHz sine wave derived from oscillator 100 to form an AM signal. This AM signal is then passed in turn through two series connected 1H delay lines 102, 104. The input drivers 106, 108 and output buffers 110, 112 are matching amplifiers whose purpose is to compensate for loss introduced by the delay lines and to match the impedance of the lines. The three AM signals now available, one undelayed, another delayed by one horizontal line period, and the other delayed by two periods, are each demodulated by envelope detectors 114, 116 and 118, and the resultant signals are again band-limited to about 1 MHz by low pass filters 120, 122 and 124. The modulation and demodulation functions are not strictly required from an operational standpoint, but handling the composite signal in this manner enables the use of less expensive delay lines and thus offers some practical advantages.

The three baseband video signals are now separately applied to the positive or non-inverting inputs of three video amplifiers 126, 128 and 130 of equal gain. The negative or inverting inputs of each amplifier are connected to resitive summing nodes which supply one half of the sum of the other two baseband signals. Thus, a separate color difference signal appears at the output of each video amplifier, since the matrixing performed at the inputs has the effect of comb filtering the luminance components from the signal. This matrixing corresponds to that shown mathematically at the outputs of matrix 84 in FIG. 3.

The signals appearing at the video amplifier outputs are now applied to a commutator 132 whose purpose is to route each color difference signal to its proper output channel. A resistive gain control is provided on each output tap to being each color difference signal to full amplitude. Thus, the (G-Y) channel would have a gain of units, the (R-Y) channel would have a gain of $(0.51)^{116\ 1}$, and the (B-Y) channel would have a gain of $(0.19)^{116\ 1}$. The gain equalized color difference signals are then amplified equally by video amplifiers 134, 136 and 138, and supplied to a suitable color monitor for viewing.

Returning now to the composite, encoded input signal and following it down the vertical path on the left in FIG. 5, it is first passed through a delay compensator 140 so that it is brought into phase with the signals which have been low passed through the 1 MHz filters 96 and 120. The delayed signals is then added at 142 to a fraction of the signal appearing at the output of video amplifier 126 after a polarity reversal by inverter 144. By appropriate adjustment of the comb filter balance control 146 the chrominance signal appearing at the output of video amplifier 126 is subtracted from the composite signal to yield a comb filtered luminance signal at the output of adder 142. That is, the color difference or chrominance signal at the output of video amplifier 126 is the same chrominance signal that is spectrum interleaved with the luminance signal at the output of the delay compensator 140. By inverting the separated chrominance signal and applying it at the proper amplitude level to the adder 142 the interleaved and separated chrominance signals can be made to fully cancel out, thus leaving the pure luminance signal remaining at the adder output. This luminance signal is then supplied to a suitable monitor, along with the chrominance signals, for viewing.

The composite input signal is also routed through a band pass amplifier 148 centered about 2 MHz. This extracts the portion of the signal around 2 MHz, including the 2 MHz line indentification burst appearing on the back porch of each line carrying the [Y + 0.51 (R-Y)] signal. This signal is then passed through gate 150 by a horizontal drive pulse, which extracts the line identification burst, and is in turn band passed again at 152 and rectified by peak detector 154. The rectified 2 MHz pulse is then fed through a pulse shaper 156 and the resulting sequence reset pulse is applied to the commutator 132. The purpose of this sequence reset pulse is to reset the commutator to ensure that each color difference signal is always applied to its correct output channel.

Figure 6:
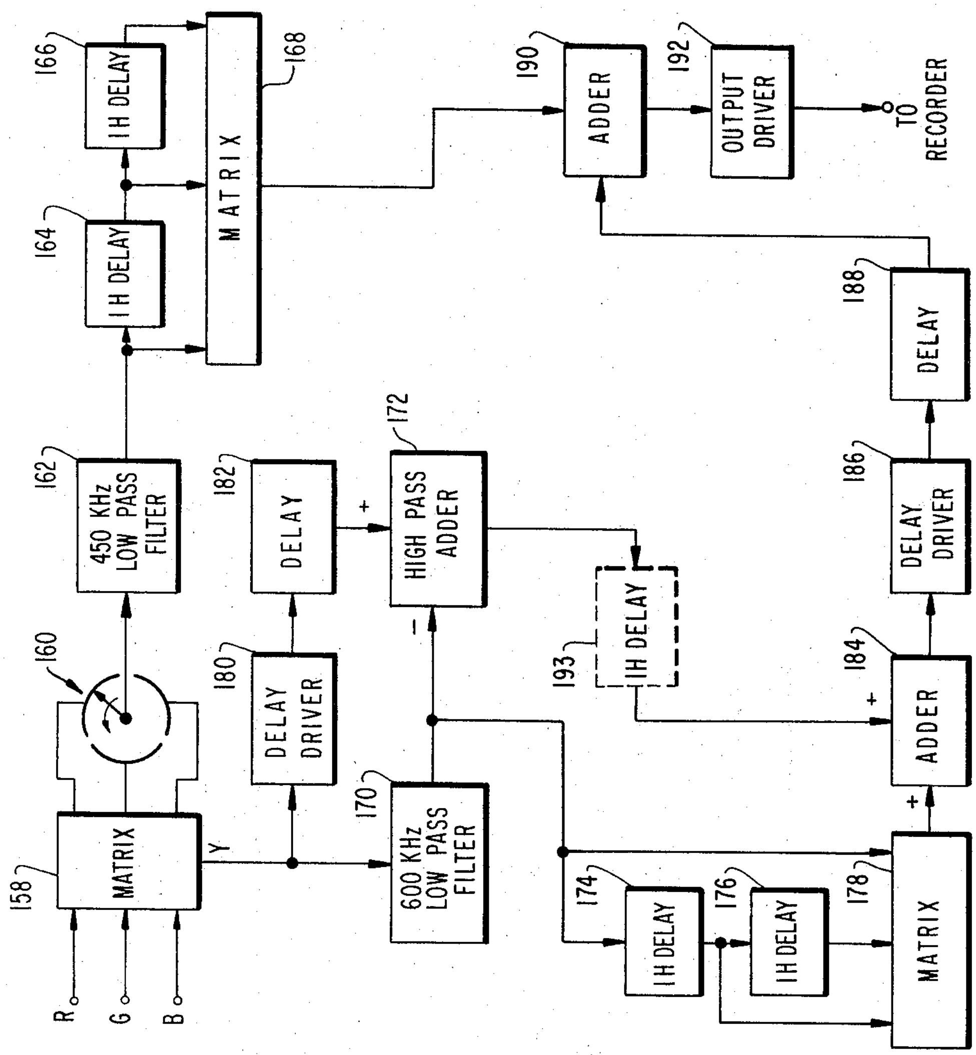
FIG. 6 shows a detailed block diagram of a line sequential encoder incorporating prefiltering means to avoid crosstalk between the interleaved luminance and chrominance signals.

FIG. 6 shows a detailed block diagram of a line sequential encoder suitable for use with the coding format of Table IV, or for that matter any given coding format that repeats over a three line period. The primary color inputs RGB are applied to an encoding matrix 158 which derives a luminance signal Y and three color difference signals that are applied to a sequencing switch 160. The output from the latter is passed through a 450 Khz low pass filter 162 to a comb filter comprising delay elements 164, 166 and a matrix 168. The purpose of the comb filter is to prefilter the chrominance signal by combing out chrominance signal components that would fall in the passbands of the the decoder's luminance comb filter. The comb filter thus prepares the chrominance signal for more effective interleaving with the luminance signal to preclude cross-talk from chrominance into luminance upon decoding.

The luminance signal from the matrix 158 is band-limited to 600 KHz in low pass filter 170, whose output is applied to both the subtractive input of a high pass adder 172 and to a comb filter comprising 1H delay elements 174, 176 and a matrix 178. The full spectrum luminance signal is also fed through a delay driver 180 and a delay element 182 whose output is then applied to the positive input of the adder 172. The delay 182 compensates for the phase lag of the low pass filter 170. The net effect of components 170, 172, 180 and 182 is to high pass filter the luminance signal by subtracting or cancelling out its low frequency components in adder 172.

The output from matrix 178 provides the low frequency portion of the luminance signal freed of luminance signal components that would fall in the pass bands of the decoder's chrominance comb filter. This combed low frequency portion is recombined with the high frequency components of the luminance signal in adder 184, whose output is fed through delay driver 186 and delay 188 to adder 190. The purpose of the delay 188 is to restore the proper phase relationship between the luminance and chrominance signals by compensating for any phase lag suffered by the chrominance signal in the low pass filter 162 and the chrominance comb filter. The prefiltered luminance and chrominance signals are then interleaved in adder 190 whose output is amplified by driver 192 and supplied to a suitable video recorder. This prefiltering of both the luminance and chrominance spectrums thus enables more effective interleaving and eliminates crosstalk problems that might otherwise develop.

Since the effect of the delay elements 174, 176 results in the output from matrix 178 being the combined low frequency luminance components from three successive horizontal lines, some slurring of sharp horizontal edges may be noticed playback monitoring. This may be minimized by providing an additional 1 H delay element 193, shown in broken line form, between adders 172 and 184, which in effect delays the high frequency luminance components one horizontal line period so that they coincide with the second or median line of the three averaged lines of comb filtered low frequency luminance components.

Figure 7:
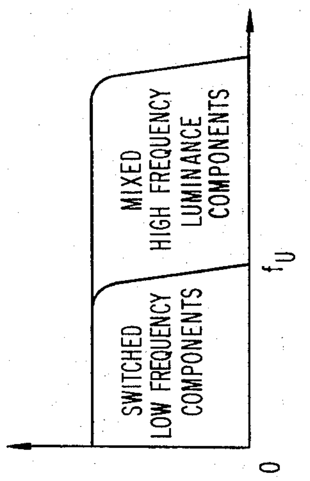
FIG. 7 shows the frequency bands normally occupied by the low frequency and high frequency signal components.
Figure 8:
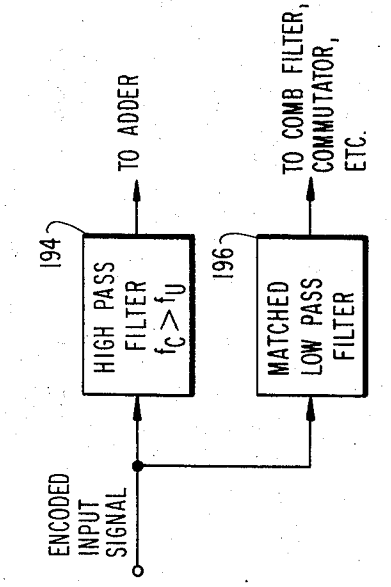
FIG. 8 shows a block diagram of a filter arrangement for avoiding contamination between the low frequency and high frequency components.

FIG. 7 shows the frequency band relationship in an encoded line sequential signal between the interleaved low frequency luminance and chrominance components, switched at the horizontal line rate, and the mixed high frequency luminance components. If an appreciable amount of the switched low frequency signals is allowed into the mixed high frequency luminance channel during decoding, edge serrations will be noticed on vertical transitions in the reconstructed image. This effect can be avoided, as shown in FIG. 8, by setting the cutoff frequency $f_c$ of the high pass luminance filter 194 in the decoder above the cutoff frequency $f_u$ of the low pass filter in the encoder, i.e. low pass filter 162 in FIG. 6. The cutoff frequency of the low pass filter 195 in the decoder is then matched to that of the high pass filter 194. Since the low pass filter in the encoder limits the upper frequency $f_u$ of the line-switched components, by setting the cutoff frequency $f_c$ of the decoder high pass filter above $f_u$, no switched signal components will thus be able to contaminate the mixed high frequency components.

I claim:

1. A line sequential encoder for a color television recording system, comprising:

a. input means supplying a set of color signals representative of a color image scanned in a series of lines;

b. an encoding matrix coupled to the input means for deriving therefrom a luminance signal comprising components whose frequencies lie primarily at integral multiples of the horizontal line scanning frequency and a plurality of color difference signals comprising components whose frequencies lie primarily at integral multiples of the horizontal line scanning frequency;

c. switching means synchronized with the horizontal line scanning frequency for sequentially coupling each one of the plurality of color difference signals to an output terminal in a cyclic, repetitive manner to develop a chrominance signal at said output terminal comprising components whose frequencies lie primarily at spectral locations intervening integral multiples of the line scanning frequency; and d. adding means, responsive to the luminance signal derived by said matrix and to the chrominance signal developed at said switching means output terminal, for combining said luminance and chrominance signals to provide a composite output signal for recordation.

2. A line sequential encoder as defined in claim 1 further comprising a low pass filter connected between the switching means and the adding means for limiting the upper frequency of the color difference signals.

3. A line sequential encoder as defined in claim 1 wherein the luminance signal (Y) encompasses frequencies beyond the highest frequency of said color difference signals, and said plurality of color difference signals comprise three signals respectively equal to (G-Y), 0.51 (R-Y) and 0.19 (B-Y).

4. A line sequential encoder as defined in claim 2 wherein the luminance signal (Y) encompasses frequencies beyond the highest frequency of said color difference signals, and said plurality of color difference signals comprise three signals respectively equal to 0.493 (B-Y), 0.877 (R-Y) cos 30°-0.493 (B-Y) cos 60°, and -0.877 (R-Y) cos 30°–.493 (B-Y) cos 60°.

5. A line sequential encoder as defined in claim 1 further including means for prefiltering the luminance signal prior to combination with said chrominance signal in said adding means to remove therefrom luminance signal components whose frequencies lie at said intervening spectral locations, and means for prefiltering said chrominance signal prior to combination with said luminance signal in said adding means to remove therefrom chrominance signal components whose frequencies lie at integral multiples of the line scanning frequency.

6. A line sequential encoder as defined in claim 5 wherein each of said prefiltering means comprises a separate comb filter.

7. A line sequential encoder as defined in claim 6 wherein said luminance signal prefiltering means further includes means for separating the low frequency and high frequency components of the luminance signal means for applying the low frequency components of the luminance signal to the luminance comb filter, and means for recombining the combed low frequency components of the luminance signal with the high frequency components thereof.

8. A line sequential encoder as defined in claim 7 further comprising a low pass filter connected between the switching means and the chrominance comb filter for limiting the upper frequency of the chrominance signals.

9. A line sequential encoder as defined in claim 8 wherein there are three chrominance signals and both the luminance and chrominance comb filters each comprise two series connected delay elements each providing a time delay equal to one horizontal line scanning period, and matrix means supplied with the signals at the input, intermediate and output nodes of the delay elements.

10. A line sequential decoder for a color television recording system wherein the signal coding format for each horizontal line of the scanned image comprises a luminance signal and one of a plurality of sequential repeating color difference signals, comprising:

a. means supplying a composite recorded input signal, b. means for deriving a luminance signal from the input signal, c. comb filtering means comprising:

1. a plurality of series connected delay elements each providing a time delay equal to one horizontal line scanning period and defining input, intermediate, and output signal nodes, the input signal node being coupled to the supply means, and
2. decoding matrix means receiving inputs from predetermined ones of the signal nodes for simultaneously deriving therefrom each one of the plurality of color difference signals, and d. commutator means receiving the chrominance signals from the decoding matrix means for simultaneously and individually coupling each color difference signal to a predetermined one of a plurality commutator outputs.

11. A line sequential decoder as defined in claim 10 wherein the means for deriving a luminance signal comprises a further comb filter comprising said plurality of series connected delay elements and further decoding matrix means receiving inputs from predetermined ones of the signal nodes.

12. A line sequential decoder as defined in claim 11 wherein:

a. the sequence of the color difference signals repeats every four horizontal lines and is of the form $+a$, $+b$, $-a$, $-b$, g. there are three series connected delay elements defining input, first intermediate, second intermediate, and output signal nodes, and c. the decoding matrix means comprises:

1. a first two input adder including means for inverting one of said two inputs,
2. means for coupling the input and second intermediate signal nodes to the two first adder inputs,
3. a second two input adder including means for inverting one of said two inputs, and
4. means for coupling the first intermediate and output signal nodes to the two second adder inputs.

13. A line sequential decoder as defined in claim 12 wherein the further decoding matrix means comprises means for adding the signals at the input and second intermediate signal nodes.

14. A line sequential decoder as defined in claim 11 wherein:

a. the sequence of the color difference signals repeats every three horizontal lines and is of the form $+a$, $-(a+b)$, $+b$, b. there are two series connected delay elements, and c. the decoding matrix means receives three input signals from the input, intermediate and output signal nodes, and derives therefrom three color difference output signals, each output signal being equal to one of the input signals minus onehalf of the sum of the other two input signals.

15. A line sequential decoder as defined in claim 14 wherein the further decoding matrix means comprises means for adding the signals at the input, intermediate, and output signal nodes.

16. A line sequential decoder as defined in claim 15 further comprising:

a. first filter means connected between the supplying means and the input signal node for limiting the upper frequency of the composite input signal, b. second filter means connected to the supplying means for limiting the lower frequency of the composite input signal, and c. means for adding the output from the second filter means and the adding means recited in claim 15.

17. A line sequential decoder as defined in claim 10 wherein the means for deriving a luminance signal comprises means for adding the composite input signal and an inverted one of the plurality of color difference signals.

18. A line sequential decoder as defined in claim 17 wherein:

a. the sequence of the chrominance signals repeats every three horizontal lines and is of the form $+a$, $-(a+b)$, $+b$, b. there are two series connected delay elements, and c. the decoding matrix means receives three input signals from the input, intermediate, and output signal nodes, and derives therefrom three color difference output signals, each output signal being equal to one of the input signals minus one-half of the sum of the other two input signals.

19. A line sequential decoder as defined in claim 18 wherein the decoding matrix means comprises:

a. three differential amplifiers each having a noninverting input and an inverting input, b. means individually connecting the signal at the input, intermediate, and output signal nodes to respective ones of the noninverting amplifier inputs, and c. means individually connecting one-half of the sum of the signals at the two nodes not connected to the noninverting input of each amplifier to the inverting input of each said amplifier.

20. A line sequential decoder as defined in claim 19 wherein the inverted one of the plurality of chrominance signals recited in claim 17 is derived from an inverter connected to the output of the differential amplifier whose noninverting input is connected to the input signal node.

21. A line sequential decoder as defined in claim 20 further comprising means for adjusting the amplitude of the inverter output.

22. A line sequential decoder as defined in claim 19 wherein the means recited in sub-paragraph (c) of claim 19 comprises resistive summing networks.

23. A line sequential decoder as defined in claim 10 further comprising filter means connected between the supplying means and the input signal node for limiting the upper frequency of the composite recorded signal.

24. A line sequential decoder as defined in claim 10 further comprising means connected between the supplying means and the commutator means for recovering a color synchronizing signal from the composite recorded signal.

25. A line sequential decoder as defined in claim 20 further comprising delay means connected between the supplying means and the adding means for compensating for any phase imbalance between the composite input signal and the inverted chrominance signal.

26. A line sequential decoder as defined in claim 10 wherein the chrominance signal interleaved in the composite recorded signal have an upper frequency limit, and further comprising filter means connected to the supplying means for limiting the lower frequency of the signal coupled to the means for deriving a luminance signal to a value above said upper frequency limit.

27. In a color television recording system, means for deriving signals representative of the luminance of a color image;

means for subjecting said luminance signals to signal component removal at a plurality of regularly spaced spectral locations extending over a given frequency band; means for developing signals representative of the chrominance of said color image and occupying said given frequency band, said developing means including means for substantially confining said chrominance representative signal to components at said plurality of regularly spaced spectral locations; and means for combining the outputs of said luminance signal subjecting means and said chrominance signal developing means to form a composite signal in which luminance representative signal components and chrominance representative signal components share said given frequency band in substantially non-overlapping, interleaved relationship.

* * * * *